United States Patent Office 3,359,160
Patented Dec. 19, 1967

3,359,160
BUTANE TETRACARBOXYLIC ACID POTENTIATION OF 5-OXYTETRACYCLINE BLOOD SERUM LEVELS
Richard S. Gordon, St. Louis, Mo., assignor to Monsanto Company, St. Louis, Mo., a corporation of Delaware
No Drawing. Filed Mar. 4, 1965, Ser. No. 437,266
3 Claims. (Cl. 167—53)

This application is a continuation-in-part of application Ser. No. 222,631, filed Sept. 10, 1962, now abandoned.

This invention relates to tetracyclic antibiotics and to procedures for using them effectively. More specifically, the invention is directed to the use of tetracycline antibiotics in the control of bacteria and other pathogenic organisms in the bodies of higher animals, particularly birds and mammals. More specifically, the invention relates to animal feeds containing tetracycline antibiotics in an effective formulation.

When a living organism ingests a tetracycline antibiotic, especially tetracycline, 5-oxytetracycline or 7-chlorotetracycline, it enters the body fluids and becomes active in the control of parasitic bacteria, viruses, and other pathogens present in the said fluid. Often the control of these organisms depends upon a substantial concentration of the antibiotic in the body fluid, especially in the blood. The effective concentration can be attained by increasing the quantity charged to the feed, but this procedure is often not desirable because of the cost of the tetracycline antibiotic and because of the inefficient utilization of the additional amount. By analytical procedures the concentration in the blood can be determined and this is a measure of the degree of protection which the host animal is receiving from the antibiotic. If the animal is seriously infected the use of the antibiotics may manifest growth response or an improvement in feed efficiency.

The availability of the tetracycline antibiotics and the concentration in the blood may under certain conditions be influenced by other food components. Soluble calcium compounds inhibit the assimilation of the antibiotics and it is desirable to keep them at a minimum by either reducing the calcium content or by substituting very insoluble compounds, such as calcium sulfate, for the more soluble calcium carbonate and limestone usually used. The inhibiting effect of calcium can also be minimized by the addition of sodium salts of acids which form very insoluble calcium salts, for example of phosphoric acid, such as sodium phosphate ($Na_3PO_4$), dibasic sodium phosphate ($Na_2HPO_4$) and dihydric phosphate ($NaH_2PO_4$).

The phrase "tetracycline antibiotics" as used in this specification and the appended claims is intended to have a generic significance and includes a variety of compounds which have antimicrobial activity and have similar structures to which have been assigned the generic name "tetracycline" by the Chemical Abstracts Nomenclature (S.A.C.S., 74, 4976). Many of the tetracycline antibiotics are produced by culturing certain fungi and separating the bacterial active compounds produced by the fungi. Other "tetracycline antibiotics" are synthesized by the chemical modification of naturally produced tetracycline antibiotics.

The tetracycline antibiotics will have the basic structure

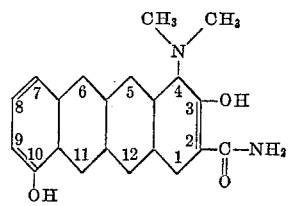

(1)

with substituents which may vary in position and kind.

The accepted nomenclature regards the tetracycline (Achromycin) as being:

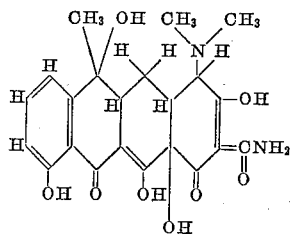

(2)

The substituted tetracyclines include:

| Substituent: | Amine name |
|---|---|
| 5-OH | (Terramycin) 5-oxytetracycline. |
| 7-Cl | (Aureomycin) 7-chlorotetracycline. |
| 7-Br | 7-bromotetracycline. |

Other homologues include:

6-deoxy-5-oxytetracycline
4-de(dimethylamino)-5-oxytetracycline
6-deoxytetracycline
6-deoxy-6-demethyltetracycline
6-methyl-7-chlorotetracycline
4-de(dimethylamino)tetracycline
4-de(dimethylamino)-7-chlorotetracycline
6-demethyltetracycline.

Other tetracyclines of the basic structure are:

4-dimethylamino-1,4,4a,5,7,8,9,10-decanhydro-3,11,12a-trihydroxy-6-methyl-1,10-dioxo-2-naphthacenecarboxamide
carboxamido-N-(isopropyl)-6-deoxy-7-chlorotetracycline
6-demethyl-12a-deoxyanhydrotetracycline
5a-epitetracycline
6-methylene-5-oxytetracycline
6-demethyl-7-chlorotetracycline
7-bromo-6-dimethyl-6-deoxytetracycline
8-12a-dibromo-1,4,4a,5,12,12a-hexahydro-3,10,11-trihydroxy-6-methyl-1,12-dioxo-2-naphthacene carboxamide.

Other compounds containing the basic configuration (1) and their water-soluble salts are also embraced by the term "tetracycline antibiotics." The use of all of these compounds in the control of parasitic bacteria and other pathogens, and especially in the body fluids, is well known and not part of this invention. It is also known that the tetracycline antibiotics enter the bloodstream and that the concentration of the antibiotics in the blood is a measure of the ability of the animal to resist the deleterious effects of the bacteria. Furthermore, it is known that by increasing the quantity of the antibiotic introduced in the digestive tract, the concentration in the bloodstream can be increased.

It has been found that by the concurrent introduction of certain chemicals greatly increased antibiotic concentrations in the blood will occur. Although the phenomenon of antibiotic potentiation is known, the compounds used in this manner are not greatly effective and provide only minimal beneficial effects. The primary purpose is to provide compositions which when fed to animals will induce high levels of the tetracycline antibiotics in the bloodstream. A further purpose is to provide a procedure which will enable the animals to become more resistant to harmful bacteria and will provide for a more efficient use of the antibiotic.

It is known that aromatic polybasic acids will potentiate the antibiotic absorption in animals. Terephthalic acid has found wide experimanetal usage and is regarded as the standard potentiation which determines the activity necessary for commercial acceptance. In the experiments described hereinafter the potentiating effect is measured as a percentage of the effect of terephthalic acid or as a percent of improvement over terephthalic acid.

In accordance with this invention it has been found that butane tetracarboxylic acid and water-soluble salts, such as the sodium salts are unusual potentiators of tetracycline antibiotics.

To demonstrate the criticality of structure to potentiating activity a series of studies were made on butane tetracarboxylic acid and near homologues.

*Example 1*

Newly hatched chicks were raised on an antibiotic free poultry feed. At the age of three to four weeks the birds were individually weighed and each fed with about 75 mg. per kg. of body weight of 5-oxytetracycline and about 400 mg. per kg. of body weight of the candidate potentiator. Birds fed terephthalic acid were used as control. Three hours after being fed blood was drawn by heart puncture, centrifuged to separate the serum which was assayed for antibiotic concentration. The following table sets forth the antibiotic effect of the potentiator as a percentage of the potentiating effect of terephthalic acid:

| | |
|---|---|
| Butane tetracarboxylic acid | 270 |
| Terephthalic acid | 100 |
| Tricarboxybutane | 43 |
| Polymaleic acid | 100 |
| Mercaptosuccinic | 80 |
| Dimethylglutaric | 65 |

It will be noticed that the butane tetracarboxylic acid was substantially more active than terephthalic acid as a potentiator and none of the others were any more active than the terephthalic acid.

In accordance with this invention it has been found that surfactant compounds will additionally potentiate antibiotic activity in animals. The phenomenon appears to be inherent in the nature of surface activity and accordingly a wide choice is available in the selection of the compound for potentiation of the antibiotic.

The surfactant which can be used in the practice of this aspect of the invention may be any of a large number of compounds which have both hydrophobic and hydrophilic properties. A wide variation of molecular configurations and chemical properties are possible. These surface active compounds may have cationic or anionic properties or may be neither cationic nor anionic (nonionic). Some surface active agents may have both cationic and anionic functional configurations, which agents are known as ampholytic surfactants.

Several distinct types of anionic surfactants may be used, for example the straight chained naturally occurring fatty acids and their soaps. This type includes the fatty acids derived from animal and vegetable oils by the conventional saponification procedures, such as stearic acid, ricinoleic acid, margaric acid, lauric acid, myristic acid, palmitic acid, capric acid, caprylic acid, oleic acid, linoleic acid and linolenic acid, the alkali metal salts of these acids, particularly the sodium and potassium salts, the heavy metal soaps of these acids, such as the salts of metals such as lead, cobalt, manganese, Zn, nickel, aluminum, copper, iron and chromium, and the amino soaps, wherein the said acids are reacted with amines, for example as in diethylaminostearate, di-n-butylaminolaurate and anilinopalmitate.

Modified carboxylic acids of somewhat different properties may be made by substituting organic groups on the aliphatic chain, for example by oxidation which can take place on an unsaturated linkage to form a hydroxyl or epoxy group. Formic acid may be added to a double bond. By halogenation of the alpha carbon atom, hydroxylated alkyl substituents can be introduced. Halogenation on the unsaturated bonds provides a means of introducing side chains or functional groups. Other groups can be added directly to the double bond, for example formaldehyde will react with oleic acid to form a six member oxygen heterocyclic substituent. A variety of other mixed carboxylic acids can be prepared by saponification of the wool, wax or by separation from tall oil. Other acids can be prepared from paraffins by oxidation to carboxy, keto and hydroxyl groups accompanied by the formation of lower molecular weight compounds. These carboxylic acids may have intermediate groups such as ester, ether, or sulfonyl. All of these modified carboxylic acids may be used as surface active agents or may be converted to salts of alkali or heavy metals, or to amine soaps.

Another group of anionic surfactants are the esters of sulfur acids, such as sodium lauryl sulfate, the various alkali metal alkylaryl sulfonates, for example sodium dodecylbenzene sulfonate, sodium-2-ethylhexylnaphthyl sulfonate and sodium octadecylbenzene sulfonate. These and other sulfuric acid esters can be prepared by first reducing the acids, for example by sodium or by hydrogenation followed by sulfonation. Oxo alcohols and other synthetic alcohols such as keryl alcohols, made by chlorination of kerosene, reacting with sodium benzoate and saponifying the resulting product, or the alcohol made by reaction of formaldehyde with triisobutylene may also be sulfated. Olefins or olefin polymers (polypropylenes and isobutylene polymers) may be sulfated directly. Ester alcohols and amidoalcohols will by sulfonation procedures provide valuable surfactants. Many alkane sulfonates, for example octadecyl sulfonate, those prepared by oxidation of long chain alkyl mercaptans, those prepared by direct reaction of paraffin oils with $SO_3$ or chlorosulfonic acid are valuable anionic surfactants. Petroleum sulfonates known as mahogany or green soaps, byproducts from the petroleum refining industry, are useful.

Other types of anionic surfactants are the phosphorus compounds such as di(2-ethylhexyl)orthophosphate or the acid phosphate esters of coco-monoethanolamide; sulfinic acid made by reduction of sulfonyl chlorides, the sulfonamides, the hydrogenated aromatization or polymerization of tall oil rosin acids, the lignin sulfonate byproducts from the sulfite paper industry and the lignin sulfonates modified by controlled alkaline hydrolysis. These anionic surfactants have a long chain oil soluble group and an ionizable acid or salt group to provide the anionic properties.

The useful surfactants for the practice of this invention also include many of the cationic types, for example, the fatty acid nitriles prepared by the reaction of ammonia and fatty acid under pressure at elevated temperatures; amines with or without intermediate ester, ether or amide linkages; the amino alcohols; allyl diamines; the alkyl anilines; the imidazolines made by condensing fatty acids with ethylene diamine; the quaternary nitrogen bases containing a long chain oil soluble group and an ionizable acid group, usually chloride or bromide, such as tetradecyl pyridinium chloride; N-alkyl morpholine, which may be quaternized, for example with butyl bromide; the reaction product of pyridine and 2-chloroethyl dimethyl dodecyl ammonium chloride; the reaction products of tertiary amines and chloromethyl stearamide, the thiouronium salts, such as the reaction product of chlorinated paraffin and urea; and the phosphonium salts, such as higher alkyl bis(dimethylamino)phosphonium halides.

Another and very important type of surfactant, which can be used is that having neither anionic or cationic properties. These are called nonionic surfactants and include esters, ethers, alcohols and phenols which do not have ionizable substituents. They must have an oil attractive long chain hydrocarbon group and a hydrophilic substituent which is nonionogenic. This type of surfactant includes polyhydroxy compounds such as the fatty acid esters of the polysaccharides, such as sucrose and dextrose; the fatty acid monoesters of glycols; esters of fatty acid monoglycerides and hydroxy acids, such as lactic or glycolic acids; and the glucose derivatives, for example the transesterification product of methyl glucoside and long chain fatty acid esters. The bulk of the nonionic surfactants are based on ethylene oxide or homologues thereof, wherein the hydrophilic properties are due the presence of a plurality of ethoxy groups. Many of these are prepared by the condensation of a large excess of ethylene oxide on a nonionic hydrophobic phenol or alcohol, for example, dodecylphenol, but they also can be prepared by reacting a long chain fatty acid with a large excess of ethylene oxide which reacts with the ionogenic carboxy groups to form hydroxy ethyl esters, for example ethoxy (ethoxy)$_n$ stearate, and the ethylene oxide (9 mol) condensate with tetrapropylenebenzene sulfonic acid. An increase in the number of mols of ethylene oxide increases the hydrophilic properties. The nonionic surfactants may have in the hydrocarbon structure non-hydrocarbon groups such as tertiary amino nitrogen, sulfide, sulfone and ester groups. The intermediates for condensation with ethylene oxide have terminal groups such as hydroxy, aldehyde, carboxyl, mercapto, sulfonic acid, sulfonamide, guanylurea, amino and amido. These will provide the necessary surface active properties.

One additional type of surfactants are the ampholytic compounds possessing both cationic and anionic groups, for example N-dodecyl-N-phenyl, amino carboxylic acids or salts, dimethylaminoethyl benzene sulfonic acid quaternized with an alkyl halide and the carboxylic acids containing an imidazoline molecular grouping.

Frequently, the surface active agents may be improved or otherwise modified by the incorporation of additives known as builders such as pyrophosphates, tripolyphosphate, sodium silicates, clays, particularly the expanding lattice type silica gels, sodium zincate, colloidal aluminum hydroxide, ammonium carbonate, dicyandiamide and sodium ferrocyanide.

Other surfactants and methods for their preparation and use are described in detail in the textbook, "Surface Active Agents and Detergents," Schwartz, Perry and Berch, Interscience Publishers Inc. (1958). The word "surfactants" is used to define the broad class, all of which appear to aid the absorption of the tetracycline antibiotics and transfer from the digestive system into the bloodstream.

The following are additional examples of useful surfactants for practicing this invention:

dodecylbenzene sodium sulfonate (85% active);
dodecylbenzene sodium sulfonate (70% active);
dodecylbenzene sodium sulfonate (40% active);
mixed acids derived from tallow condensed with ethylene oxide;
alcohols from tallow acids condensed with ethylene oxide;
long chain mixed mercaptans condensed with ethylene oxide;
dodecyl phenol condensed with 6 mols of ethylene oxide;
nonyl phenol condensed with ethylene oxide;
long chain alcohols condensed with ethylene oxide (85% active);
n-mixed alkyl, 8–18 carbon atoms, trimethyl ammonium chloride;
1,3-propane diamine partially quaternized with halides derived from tallow oil and condensed with ethylene oxide.

Example 2

Sheep were infused with 5-oxytetracycline at the rate of about 50 mg. per kg. of body weight directly into the abomasum. Two hours after treatment the blood serum concentration of these sheep was 1.81 micrograms per ml. Other sheep infused with the same amount of 5-oxytetracycline and approximately 400 mg. per kg. of body weight of butane tetracarboxylic acid, and after two hours the blood serum concentration of the antibiotic was 3.99 micrograms per ml. A control experiment in which about 50 mg. of 5-oxytetracycline per kg. of body weight and about 400 mg. of terephthalic acid per kg. of body weight was found to provide a concentration of 3.54 micrograms per ml. This shows that butane tetracarboxylic acid in ruminants is more active than terephthalic acid.

Example 3

A chick feeding test was conducted with a feed containing about 400 gm. of 5-oxytetracycline per ton. Chicks were also fed the same diets with about 0.25, 0.50, 0.75 percent of butane tetracarboxylic acid. After one week, blood samples were drawn and assayed for antibiotic. The following table sets forth the observed data:

| Percent tetracarboxybutane: | Antibiotic micrograms mg./ml. |
|---|---|
| 0.0 | 2.05 |
| 0.25 | 2.57 |
| 0.50 | 3.37 |

This invention may be practiced in preparation of animal feeds by incorporating tetracycline antibiotics and the butane tetracarboxylic acid in a conventional animal food or a mixture of feed components usually used in feed preparation. The surfactant which provides an additional potentiation effect is an optional component but one that is preferred for the most efficient and economical practice of the invention. The butane tetracarboxylic acid and surfactant may be added to prepared feeds which include the tetracycline antibiotics, often a conventional component in animal feed.

For effective practice of the invention from about 50 to about 500 grams of the tetracycline antibiotic per ton of feed may be used, either already present or added in the preparation of the potentiated feed. The potentiation and the surfactant may each be used to the extent of about one to about twenty-five pounds per ton. Thus, on a weight basis, the compositions of the present invention contain between about one and about 250 parts of butane tetracarboxylic acid for each part of antibiotic. The optimum practice may use from about 150 to about 300 grams of the antibiotic per ton and from five to twenty pounds per ton of the surfactant and the butane tetracarboxylic acid. When feed compositions contain a tetracycline antibiotic the potentiation will be added as supplements to provide composition with the above described components.

The so-called conventional components will vary in accordance with the intended use. The prepared feeds containing antibiotics and the potentiators are useful in feeding poultry and non-ruminant animals, including young ruminants, such as calves and lambs, which do not acquire the rumen until they approach maturity.

Although the invention is described with respect to specific modifications, it is not intended that the details thereof shall be limitations on the scope of the invention except to the extent incorporated in the following claims.

What is claimed is:
1. A method of potentiating the concentration of 5-oxytetracycline in the blood serum of a host animal which comprises substantially concurrently feeding the host animal an orally-acceptable composition containing 5-oxytetracycline, and an orally-acceptable composition containing between about one and about 250 parts, based on the weight of the 5-oxytetracycline, of butane tertacarboxylic acid.
2. A method of augmenting 5-oxytetracycline blood levels of a host animal which comprises feeding the animal one part by weight of 5-oxytetracycline and from about one to about 250 parts by weight of butane tetracarboxylic acid.
3. A composition for augmenting 5-oxytetracycline blood levels of a host animal comprising one part by weight of 5-oxytetracycline and from about one to about 250 parts by weight of butane tetracarboxylic acid.

References Cited

UNITED STATES PATENTS

| | | | |
|---|---|---|---|
| 2,806,789 | 9/1957 | Kiser et al. | 99—2 |
| 2,844,466 | 7/1958 | Rogers et al. | 99—2 |
| 2,910,360 | 10/1959 | De Zeeuw et al. | 99—2 |
| 3,053,892 | 9/1962 | Sieger et al. | 260—559 |
| 3,080,288 | 3/1963 | Tonelli et al. | 167—65 |
| 3,085,933 | 4/1963 | Schooley et al. | 167—53 |

OTHER REFERENCES

Chem. Abstracts 54, 9591d (1960).
Chem. Abstracts 37, 4081(2) (1943).
Chem. Abstracts 50, P 11364 (1956).
Chem. Abstracts 52, P 10560i (1958).
Chem Abstracts 53, P 9636b (1959).
Eisner et al.: "The Enchancement of Serum Levels of Auroemycin in Experimental Animals," J. Pharmacol. and Exp. Therap. 108, pp. 442–449, August 1953.
Peterson: "Potentiating Effect of Terephthalic Acid Upon Absorption of Chlorotetracycline From the Avian Alimentary Tract," Arkansas Agr. Exp. Sta., Report Series 74, pp. 1–6, March 1958.
Peterson: "Relative Activity of the Broad-Spectrum Antibiotics in Birds as Measured by Clinical Effect," Poultry Sci. 39, pp. 960–971, July 1960.
Price et al.: "Effect of Dietary Calcium-Phosphorus Adjustment and/or Supplementation With Terephthalic Acid Upon Serum Antibiotic Levels of Chickens," Poultry Sci. 38, pp. 233–234 (1959).
Price et al.: "The Influence of Terephthalic Acid on Oxytetracycline Serum Levels in Chickens," Avian Diseases, 3, pp. 157–169 (1959).

LEWIS GOTTS, *Primary Examiner.*

S. K. ROSE, *Assistant Examiner.*